United States Patent
Wang et al.

(10) Patent No.: US 11,109,444 B2
(45) Date of Patent: Aug. 31, 2021

(54) WIRELESS COMMUNICATION METHOD AND APPARATUS FOR UPLINK TRANSMISSION WITHOUT SCHEDULING

(71) Applicant: Huawei Technologies Co., Ltd., Shenzhen (CN)

(72) Inventors: Yafei Wang, Shanghai (CN); Yi Wang, Shanghai (CN); Chi Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/787,834

(22) Filed: Feb. 11, 2020

(65) Prior Publication Data

US 2020/0178346 A1 Jun. 4, 2020

Related U.S. Application Data

(63) Continuation of application No. PCT/CN2018/100114, filed on Aug. 10, 2018.

(30) Foreign Application Priority Data

Aug. 11, 2017 (CN) .......................... 201710686237.3

(51) Int. Cl.
*H04W 28/26* (2009.01)
*H04W 80/08* (2009.01)
*H04W 72/04* (2009.01)

(52) U.S. Cl.
CPC ........... *H04W 80/08* (2013.01); *H04W 28/26* (2013.01); *H04W 72/042* (2013.01); *H04W 72/0446* (2013.01); *H04W 72/0453* (2013.01)

(58) Field of Classification Search
CPC ... H04W 80/08; H04W 28/26; H04W 72/042; H04W 72/0446; H04W 72/0453; H04L 5/0053; H04L 27/2666
See application file for complete search history.

(56) References Cited

U.S. PATENT DOCUMENTS

2013/0022083 A1* 1/2013 Vasseur ............... H04L 12/4035 375/132
2019/0349904 A1* 11/2019 Kwak ................. H04W 72/042
2020/0153672 A1* 5/2020 Choi ................... H04W 72/042

FOREIGN PATENT DOCUMENTS

| CN | 106507486 A | 3/2017 |
| CN | 106793091 A | 5/2017 |
| CN | 109152029 A | 1/2019 |

(Continued)

OTHER PUBLICATIONS

"Basic Grant-free Transmission for URLLC," 3GPP TSG-RAN WG1 Meeting #88, R1-1701594, XP051220813, total 8 pages, 3rd Generation Partnership Project, Valbonne, France (Feb. 13-17, 2017).

(Continued)

*Primary Examiner* — Wei Zhao
(74) *Attorney, Agent, or Firm* — Leydig, Voit & Mayer, Ltd.

(57) ABSTRACT

This application provides a wireless communication method performed by a terminal or a chip of the terminal, and the method includes: receiving higher layer signaling from a base station, where the higher layer signaling is used to configure a first time resource and a first frequency resource that can be used for uplink transmission without scheduling; and receiving downlink control information indicating a format of a slot, where the format indicates a transmission direction of a symbol in the slot, and an uplink symbol in the slot is a time resource that can be used for the uplink transmission without scheduling. In the method, a time resource that is dynamically allocated by the base station to the terminal via the downlink control information and that can be used for uplink transmission without scheduling is received.

20 Claims, 9 Drawing Sheets

Time-frequency resource that can be used for grant-free (grant free) uplink transmission Time-frequency resource that cannot be used for grant-free (grant free) uplink transmission

(56) References Cited

FOREIGN PATENT DOCUMENTS

WO 2016206650 A1 12/2016
WO 2017011942 A1 1/2017

OTHER PUBLICATIONS

"On using uplink grant free resource and power control for URLLC," 3GPP TSG RAN WG1 Meeting #88bis, Spokane, USA, R1-1705205, total 4 pages, 3rd Generation Partnership Project, Valbonne, France (Apr. 3-7, 2017).

"3rd Generation Partnership Project; Technical Specification Group Radio Access Network; NR; Physical layer procedures for data (Release 15)," 3GPP TS 38.214 V0.0.1, total 30 pages, 3rd Generation Partnership Project, Valbonne, France (Jul. 2017).

"Further details of group-common control," 3GPP TSG RAN WG1 Meeting #88bis, R1-1704572, XP051242711, total 5 pages, 3rd Generation Partnership Project, Valbonne, France (Apr. 3-7, 2017).

"Uplink Grant Free Transmission for URLLC," 3GPP TSG-RAN WG1 Meeting #89, Hangzhou, P.R. China, R1-1709126, total 4 pages, 3rd Generation Partnership Project, Valbonne, France (May 15-19, 2017).

"Offline discussions on UL data transmission without grant," 3GPP TSG RAN WG1 NR Ad Hoc Meeting, Qingdao, China, R1-1711969, total 7 pages, 3rd Generation Partnership Project, Valbonne, France (Jun. 27-30, 2017).

"Contents of group-common PDCCH," 3GPP TSG RAN WG1 Meeting #89, Hangzhou, China, R1-1708146, XP051273342, total 4 pages, 3rd Generation Partnership Project, Valbonne, France (May 15-19, 2017).

"Grant-free UL transmissions in NR," 3GPP TSG-RAN WG1 #86bis, R1-1609499, XP051159569, total 8 pages, 3rd Generation Partnership Project, Valbonne, France (Oct. 10-14, 2016).

CN/201710686237.3, Office Action/Search Report, dated Dec. 24, 2020.

Nokia, Alcatel-Lucent Shanghai Bell, "UE identification and HARQ for URLLC UL grant-free," 3GPP TSG-RAN WG1 Ad-Hoc NR#2, Qingdao, China, R1-1710994, total 5 pages, 3rd Generation Partnership Project, Valbonne, France (Jun. 27-30, 2017).

Huawei, HiSilicon, "Resource configuration on UL transmission without grant," 3GPP TSG RAN WG1 Ad hoc Meeting Qingdao, China, R1-1709991, total 4 pages, 3rd Generation Partnership Project, Valbonne, France (Jun. 27-30, 2017).

Spreadtrum Communications, "Discussion on UL grant-free transmission," 3GPP TSG-RAN WG2 #NR Ad hoc#2 Qingdao, P. R. China, R2-1706448, total 3 pages, 3rd Generation Partnership Project, Valbonne, France (Jun. 27-29, 2017).

JP/2020-529805, Notice of Reasons for Rejection, dated Apr. 20, 2021.

* cited by examiner

WIRELESS COMMUNICATION METHOD AND APPARATUS FOR UPLINK TRANSMISSION WITHOUT SCHEDULING

CROSS-REFERENCE TO RELATED APPLICATIONS

This application is a continuation of International Application No. PCT/CN2018/100114, filed on Aug. 10, 2018, which claims priority to Chinese Patent Application No. 201710686237.3, filed on Aug. 11, 2017. The disclosures of the aforementioned applications are hereby incorporated by reference in their entireties.

TECHNICAL FIELD

This application relates to the field of mobile communications technologies, and in particular, to a wireless communication method and an apparatus.

BACKGROUND

In 5th generation (5G) communication, grant-free uplink transmission is supported. The grant-free uplink transmission is also referred to as uplink transmission without scheduling or uplink transmission without grant, and means that uplink data is transmitted without scheduling by a base station; instead, a terminal transmits, based on an arrival status of service data, uplink data on a time-frequency resource pre-allocated by the base station.

The pre-allocated time-frequency resource, such as a resource used for the grant-free uplink transmission, is semi-statically configured via higher layer signaling such as radio resource control (RRC) signaling. Configuring the time-frequency resource specifically includes:

(1) configuring a time resource (also referred to as a time domain resource), where the time resource includes a period value of a semi-static transmission resource, and an offset value of a preconfigured time resource relative to a system frame number SFN: 0; and (2) configuring a frequency resource (also referred to as a frequency domain resource), to be specific, configuring a reserved frequency resource used for the grant-free uplink transmission. In other words, a part of a frequency resource allocated to the terminal is reserved for the grant-free uplink transmission.

Currently, a main problem of the foregoing method for semi-statically configuring the time resource for the grant-free uplink transmission is as follows: When there is a low-latency service such as an ultra-reliable and low-latency communications (URLLC) service, if a current subframe or slot includes no semi-statically configured time resource used for the grant-free uplink transmission, latency of sending service data is increased, and a low-latency requirement of the low-latency service cannot be met. In addition, when a quantity of low-latency services increases, resources are insufficient, transmission competition and collision increase, and high-reliability requirements of some services of the terminal cannot be met.

SUMMARY

This application provides a wireless communication method and an apparatus, to help meet a low-latency requirement and a high-reliability requirement of some services of a terminal.

To achieve the foregoing objective, this application provides the following technical solutions:

According to a first aspect, a wireless communication method is provided, and the method may be performed by a terminal or a chip in the terminal. The method includes: receiving first higher layer signaling from a base station, where the first higher layer signaling is used to configure a first time resource and a first frequency resource, and the first time resource and the first frequency resource can be used for uplink transmission without scheduling; and receiving downlink control information, where the downlink control information is used to indicate a format of a slot, the format indicates a transmission direction of a symbol in the slot, and an uplink symbol in the slot is a time resource that can be used for the uplink transmission without scheduling. In the method, a time resource that is dynamically allocated by the base station to the terminal via the downlink control information and that can be used for uplink transmission without scheduling is received. When the first time resource is unavailable or insufficient, the dynamically allocated time resource may be used to perform the uplink transmission without scheduling, to help meet a low-latency requirement and a high-reliability requirement of some services of the terminal.

Optionally, for uplink symbols that are in the slot and that can be used for the uplink transmission without scheduling, the uplink transmission without scheduling may be performed via all of the uplink symbols, or the uplink transmission without scheduling may be performed via only some of these symbols.

Optionally, time resources include a fixed time resource and a flexible time resource. A transmission direction of each symbol in the fixed time resource is semi-statically configured by the base station via higher layer signaling. A transmission direction of each symbol in the flexible time resource is dynamically indicated by the base station via downlink control information.

Optionally, the fixed time resource includes a fixed uplink symbol and/or a fixed downlink symbol.

Optionally, the fixed time resource is a slot, and the flexible time resource is a slot.

Optionally, the fixed time resource is a subframe, the flexible time resource is a subframe, and one subframe includes one or more slots.

Optionally, the fixed time resource is a system frame, the flexible time resource is a system frame, one system frame includes one or more subframes, and one subframe includes one or more slots.

Optionally, the time resources further include a reserved resource in addition to the fixed time resource and the flexible time resource, and the reserved resource is not used for downlink transmission or uplink transmission.

Based on a same inventive concept as that in the first aspect, in a possible design, another wireless communication method is further provided, where the method may be performed by a terminal or a chip in the terminal. The method includes: receiving first higher layer signaling from a base station, where the first higher layer signaling is used to configure a first time resource, and the first time resource can be used for uplink transmission without scheduling; and receiving downlink control information, where the downlink control information is used to indicate a format of a slot, the format indicates a transmission direction of a symbol in the slot, and an uplink symbol in the slot is a time resource that can be used for the uplink transmission without scheduling. A main difference between the wireless communication method and the wireless communication method in the first aspect is that the base station configures the first time resource for the terminal via the first higher layer signaling, but the first frequency resource may not need to be configured via the first higher layer signaling, and a description of other parts in this method is the same as that in the implementation of the first aspect. The wireless communication method is applicable to a scenario in which a base station allocates a time resource to a terminal. When the allocated time resource is insufficient, the time resource may be dynamically added. Optionally, the first frequency resource is further received from the base station. For example, the first frequency resource is indicated in activation signaling at a physical layer.

Optionally, there are the following three types of grant-free transmission:

Type 1: Uplink data transmission is performed based on only RRC configuration/reconfiguration information, without the base station delivering grant information.

Type 2: Uplink data transmission is performed without the base station delivering grant information, but the grant-free transmission needs to be activated/deactivated based on an indication of RRC configuration information and physical layer signaling (for example, L1 signaling).

Type 3: Uplink data transmission is performed without the base station delivering grant information, and some parameters semi-statically configured via RRC signaling may be modified based on RRC configuration/reconfiguration information via physical layer signaling (for example, L1 signaling), but the grant-free transmission does not need to be activated/deactivated via the physical layer signaling (for example, L1 signaling).

Optionally, when the grant-free transmission is of the type 1, the first higher layer signaling is used to configure a first time resource and a first frequency resource, and the first time resource and the first frequency resource can be used for uplink transmission without scheduling.

Optionally, when the grant-free transmission is of the type 3, the first higher layer signaling is used to configure a first time resource and a first frequency resource, and the first time resource and the first frequency resource can be used for uplink transmission without scheduling.

Optionally, when the grant-free transmission is of the type 2, the first higher layer signaling needs to indicate the first time resource instead of the first frequency resource. The first frequency resource may be indicated by the base station via L1 signaling.

Optionally, when the grant-free transmission is of the type 3, the first higher layer signaling needs to indicate the first time resource instead of the first frequency resource. The first frequency resource may be indicated by the base station via L1 signaling.

The first time resource may be, for example, a fixed uplink symbol in a slot, and in other words, the first time resource is a symbol dedicatedly used in an uplink transmission direction.

In a possible design, second higher layer signaling is received from the base station, where the second higher layer signaling is used to indicate a candidate time resource set, and the slot belongs to the candidate time resource set. In the method, the base station indicates the candidate time resource set via the second higher layer signaling, and the slot in the set is a candidate slot used by the terminal to perform the uplink transmission without scheduling. To be specific, any slot in the set may be used by the terminal to perform the uplink transmission without scheduling. Alternatively, this may be understood as indicating that if some or all of symbols in any slot in the set are configured by the base station as uplink symbols, the uplink symbols may be used for the uplink transmission without scheduling.

Optionally, the candidate time resource set includes one or more radio frames, each radio frame includes a plurality of subframes, and each subframe includes a plurality of slots. The implementation may be alternatively understood as indicating that the candidate time resource set includes one or more slots.

Optionally, the candidate time resource set includes one or more subframes, and each subframe includes a plurality of slots. The implementation may be alternatively understood as indicating that the candidate time resource set includes one or more slots.

Optionally, the candidate time resource set includes one or more slots. In this implementation, the candidate time resource set may also be referred to as a candidate slot set.

In a possible design, the candidate time resource set may not be indicated by the base station via the higher layer signaling. Instead, the candidate time resource set is pre-defined. Alternatively, the candidate time resource set is determined by the terminal.

Optionally, the terminal or the chip of the terminal groups, into the candidate time resource set, a first slot in all time resources except the first time resource or a first slot in all time resources except the first time resource and the reserved resource, and the first slot refers to a slot that includes a symbol used in a transmission direction that can be configured. Alternatively, this may be understood as indicating that the first slot is a slot whose slot format can be configured, and the slot format refers to a transmission direction of the symbol in the slot.

Optionally, the terminal or the chip of the terminal groups, into the candidate time resource set, a second slot in another time resource in a current system frame of the terminal other than the first time resource or a second slot in another time resource in a current system frame of the terminal other than the first time resource and the reserved resource. The second slot is a slot that includes a symbol used in a transmission direction that can be configured.

Optionally, the terminal or the chip of the terminal groups, into the candidate time resource set, a third slot in another time resource in time resources allocated to the terminal other than the first time resource or a third slot in another time resource in time resources allocated to the terminal other than the first time resource and the reserved resource. The third slot is a slot that includes a symbol used in a transmission direction that can be configured.

In a possible design, third higher layer signaling is received from the base station, where the third higher layer signaling is used to indicate a second frequency resource, and the second frequency resource is a subset of the first frequency resource, and an uplink symbol in the slot and the second frequency resource can be used for the uplink transmission without scheduling. The terminal may perform the uplink transmission without scheduling on the uplink symbol of the slot in a time dimension. Optionally, the terminal may perform the uplink transmission without scheduling on the first frequency resource in a frequency dimension. Optionally, the terminal may alternatively perform the uplink transmission without scheduling on the second frequency resource. The second frequency resource is indicated by the base station via the third higher layer signaling, and the second frequency resource is a subset of the first frequency resource. In other words, the second frequency resource may be equal to the first frequency resource, or may be a part (namely, a proper subset) of the first frequency resource. Optionally, when the second frequency resource is equal to the first frequency resource, alternatively, the base station may not send the third higher layer signaling. In other words, when the base station does not send the third higher layer signaling, it may be predefined that the second frequency resource of the terminal is equal to the first frequency resource.

In a possible design, indication information is received from the base station, where the indication information is used to indicate a second time resource, and the time resource and a frequency resource other than the first frequency resource can be used for the uplink transmission without scheduling. In the method, the base station indicates the second time resource via the indication information, and the terminal performs the uplink transmission without scheduling on the second time resource and the frequency resource other than the first frequency resource. In this way, in addition to the first frequency, a frequency resource used for the uplink transmission without scheduling is added, and a resource used for the uplink transmission without scheduling is further added. Therefore, latency may be further reduced, and service reliability may be improved.

In a possible design, an uplink scheduling grant is received. The uplink scheduling grant is used to indicate a scheduled third time resource and third frequency resource, where an unused uplink symbol in a slot of the third time resource and the third frequency resource can also be used for the uplink transmission without scheduling. In the method, another method for determining a time-frequency resource that can be used for uplink transmission without scheduling is provided. To be specific, the base station sends the uplink scheduling grant to the terminal, and the uplink scheduling grant is used to indicate the scheduled third time resource and third frequency resource. When there is an unused uplink symbol in the slot of the third time resource, the uplink transmission without scheduling may be performed via the unused uplink symbol and the third frequency resource, thereby further adding a resource used for the uplink transmission without scheduling, further reducing latency, and improving service reliability.

In a possible design, data is sent on the resource that can be used for the uplink transmission without scheduling.

According to a second aspect, a wireless communication method is provided, and the method may be performed by a base station or a chip in the base station. The method includes: sending first higher layer signaling to a terminal, where the first higher layer signaling is used to configure a first time resource and a first frequency resource, and the first time resource and the first frequency resource can be used for uplink transmission without scheduling; and sending downlink control information to the terminal, where the downlink control information is used to indicate a format of a slot, the format indicates a transmission direction of a symbol in the slot, and an uplink symbol in the slot is a time resource that can be used for the uplink transmission without scheduling.

In a possible design, second higher layer signaling is sent to the terminal, where the second higher layer signaling is used to indicate a candidate slot set, and the slot belongs to the candidate slot set.

In a possible design, third higher layer signaling is sent to the terminal, where the third higher layer signaling is used to indicate a second frequency resource, and the second frequency resource is a subset of the first frequency resource, and an uplink symbol in the slot and the second frequency resource can be used for the uplink transmission without scheduling.

In a possible design, indication information is sent to the terminal, where the indication information is used to indicate a second time resource, and the time resource and a frequency resource other than the first frequency resource can be used for the uplink transmission without scheduling.

In a possible design, an uplink scheduling grant is sent to the terminal. The uplink scheduling grant is used to indicate a scheduled third time resource and third frequency resource, where an unused uplink symbol in a slot of the third time resource and the third frequency resource can also be used for the uplink transmission without scheduling.

In a possible design, data sent by the terminal on the resource that can be used for the uplink transmission without scheduling is received.

According to a third aspect, this application provides an apparatus. The apparatus may be a terminal or a chip in the terminal. The apparatus has a function of implementing each embodiment of the first aspect. The function may be implemented by hardware, or may be implemented by hardware executing corresponding software. The hardware or the software includes one or more modules corresponding to the foregoing function.

In a possible design, when the apparatus is the terminal, the terminal includes a processing unit and a communications unit. The processing unit may be, for example, a processor. The communications unit may be, for example, a transceiver, and the transceiver includes a radio frequency circuit. Optionally, the terminal further includes a storage unit, and the storage unit may be, for example, a memory. When the terminal includes a storage unit, the storage unit is configured to store a computer executable instruction. The processing unit is connected to the storage unit. The processing unit executes the computer executable instruction stored in the storage unit, so that the terminal performs the wireless communication method in any design of the first aspect.

In another possible design, when the apparatus is the chip in the terminal, the chip includes a processing unit and a communications unit, where the processing unit may be, for example, a processor, and the communications unit may be, for example, an input/output interface, a pin, or a circuit. The processing unit may execute a computer executable instruction stored in the storage unit, so that the chip in the terminal performs the wireless communication method in any design of the first aspect. Optionally, the storage unit is a storage unit in the chip, for example, a register or a cache. The storage unit may alternatively be a storage unit that is in the terminal and that is outside the chip, for example, a read-only memory (ROM), another type of static storage device that can store static information and an instruction, or a random access memory (RAM).

The processor mentioned in any one of the foregoing designs may be a general-purpose central processing unit (CPU), a microprocessor, an application-specific integrated circuit (ASIC), or one or more integrated circuits for controlling program execution of the wireless communication method in the first aspect.

According to a fourth aspect, this application provides an apparatus. The apparatus may be a base station or a chip in the base station. The apparatus has a function of implementing each embodiment in the second aspect. The function may be implemented by hardware, or may be implemented by hardware executing corresponding software. The hardware or the software includes one or more modules corresponding to the foregoing function.

In a possible design, when the apparatus is the base station, the base station includes a processing unit and a communications unit. The processing unit may be, for example, a processor. The communications unit may be, for example, a transceiver, and the transceiver includes a radio frequency circuit. Optionally, the base station further includes a storage unit, and the storage unit may be, for example, a memory. When the base station includes a storage unit, the storage unit is configured to store a computer executable instruction. The processing unit is connected to the storage unit. The processing unit executes the computer executable instruction stored in the storage unit, so that the base station performs the wireless communication method in any design of the second aspect.

In another possible design, when the apparatus is the chip in the base station, the chip includes a processing unit and a communications unit, where the processing unit may be, for example, a processor, and the communications unit may be, for example, an input/output interface, a pin, or a circuit. The processing unit may execute a computer executable instruction stored in the storage unit, so that the chip in the base station performs the wireless communication method in any design of the second aspect. Optionally, the storage unit is a storage unit in the chip, for example, a register or a cache. The storage unit may alternatively be a storage unit that is in the base station and that is outside the chip, for example, a ROM, another type of static storage device that can store static information and an instruction, or a RAM.

The processor mentioned in any one of the foregoing designs may be a CPU, a microprocessor, an ASIC, or one or more integrated circuits for controlling program execution of the wireless communication method in the second aspect.

According to a fifth aspect, this application provides a computer readable storage medium, and the computer readable storage medium stores an instruction. When the instruction runs on a computer, the computer performs the method in the first aspect. The computer may be, for example, a terminal.

According to a sixth aspect, this application further provides a computer readable storage medium, and the computer readable storage medium stores an instruction. When the instruction runs on a computer, the computer performs the method in the second aspect. The computer may be, for example, a base station.

According to a seventh aspect, this application provides a computer program product. The computer program product includes a computer software instruction, and the computer software instruction may be loaded via a processor to implement the procedure in the wireless communication method in any design of the first aspect.

According to an eighth aspect, this application provides a computer program product. The computer program product includes a computer software instruction, and the computer software instruction may be loaded via a processor to implement the procedure in the wireless communication method in any design of the second aspect.

In addition, for technical effects brought by any design manner of the second aspect to the eighth aspect, refer to technical effects brought by different design manners of the first aspect. Details are not described herein again.

These or other aspects of the present disclosure are more concise and comprehensible in descriptions of the following embodiments.

DESCRIPTION OF EMBODIMENTS

Figure 1:
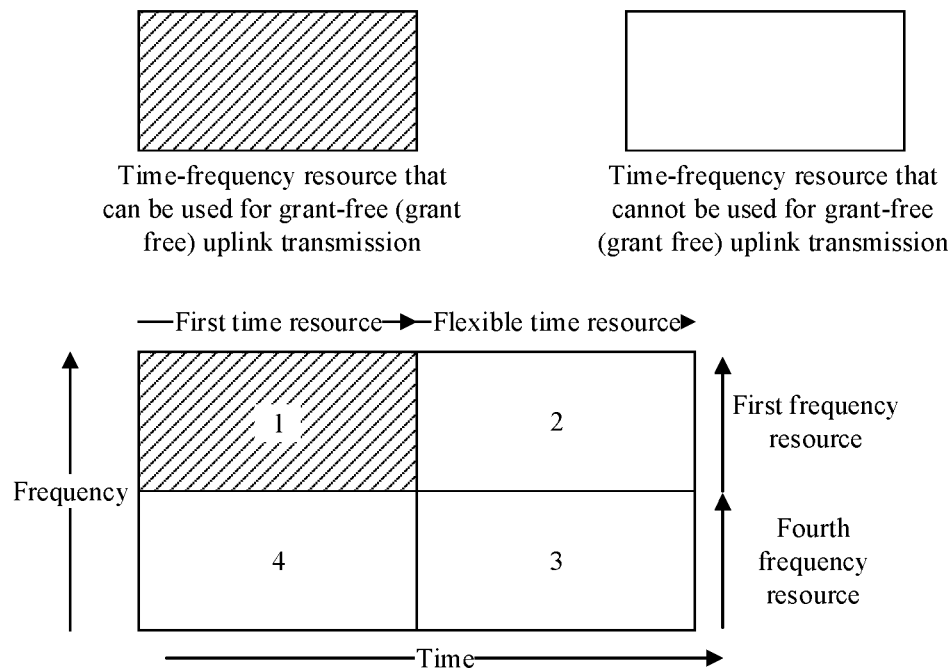
FIG. 1 is a schematic diagram of allocating a time-frequency resource in the method in the Background.

To make the objectives, technical solutions, and advantages of this application clearer, the following further describes this application in detail with reference to the accompanying drawings.

It should be noted that, a wireless communication method in this application may be performed by an apparatus. On a network side, the apparatus may be a base station or a chip in the base station, and in other words, the wireless communication method in this application may be performed by the base station or the chip in the base station. On a terminal side, the apparatus may be a terminal or a chip in the terminal, and in other words, the wireless communication method in this application may be performed by the terminal or the chip in the terminal.

For ease of description, in this application, that the apparatus is the base station or the terminal is used as an example to describe the wireless communication method. For an implementation method used when the apparatus is the chip in the base station or the chip in the terminal, refer to detailed description of the wireless communication method of the base station or the terminal. Details are not repeatedly described again.

It should be noted that, higher layer signaling mentioned in this application may be a system message (a master information block (MIB), a system information block (SIB), broadcast signaling, RRC signaling, a media access control (MAC) control element (CE), or the like). For example, first higher layer signaling, second higher layer signaling, and third higher layer signaling that appear below in this application each may be one or more of the foregoing several types of signaling, and are collectively described herein. Details are not subsequently described again.

In long term evolution (LTE), all symbols in one slot are generally dedicatedly used for uplink or downlink. Especially, for a time division duplex (TDD) system, an entire slot is used for the uplink or the downlink. This is relatively lacking in flexibility, and especially imposes relatively great limitation on a short-latency service.

In 5G new radio (NR) standardization work, to meet a requirement of a short-latency service, a flexible slot structure is supported. To be specific, all symbols in one slot may be used for the uplink or the downlink; or some symbols in one slot are used for the uplink, and some symbols are used for the downlink. The slot structure may be indicated by a group common physical downlink control channel (Group Common PDCCH) of the terminal, and may be alternatively understood as a slot format or slot format related information. The base station sends the group common PDCCH, and the terminal detects the group common PDCCH to obtain the slot format. The slot format indicates specific symbols for the uplink, specific symbols for the downlink, and other symbols in the slot. The other symbols are symbols not used for uplink information or downlink information, such as a blank resource, a guard period (GP), a reserved resource, or an unknown resource. In addition, one group common PDCCH may indicate a slot format of one or more slots.

For ease of description, in this application, time resources include a fixed time resource and a flexible time resource. For example, when expressed in slots, the fixed time resource includes a fixed slot, and the flexible time resource includes a flexible slot. All symbols in the fixed slot are dedicatedly used for the uplink or the downlink. Alternatively, this may be understood as indicating that a transmission direction of each symbol in the fixed slot is semi-statically configured by the base station via higher layer signaling. A transmission direction of each symbol in the flexible slot is variable. Specifically, the transmission direction of each symbol in the slot used during each transmission is dynamically indicated by the base station via downlink control information.

For example, the fixed slot includes a fixed uplink symbol or a fixed downlink symbol. The flexible slot may be referred to as "flexible slot" in English, and a transmission direction of each symbol in the flexible slot is dynamically indicated by the base station during use.

The fixed time resource and the flexible time resource may be alternatively expressed in symbols. For example, some symbols in one slot are semi-statically configured via higher layer signaling and dedicatedly used for the downlink, or some symbols in one slot are semi-statically configured via higher layer signaling and dedicatedly used for the uplink. Alternatively, some symbols in one slot are semi-statically configured via higher layer signaling and dedicatedly used for the downlink, and some symbols are semi-statically configured via higher layer signaling and dedicatedly used for the uplink. The fixed time resource and the flexible time resource may be alternatively expressed in a plurality of slots. This is not limited in the present disclosure.

In addition to the fixed time resource and the flexible time resource, there may also be a reserved resource. If the reserved resource is configured for the terminal, the terminal does not impose any assumption on the reserved resource. Imposing no assumption means that the terminal considers that no downlink transmission or uplink transmission occurs on the reserved resource. The reserved resource may be configured by the base station for the terminal via higher layer signaling (for example, a system information block (SIB) or radio resource control (RRC)), broadcast signaling (for example, signaling carried by a physical broadcast channel (PBCH), MAC layer signaling, or physical layer signaling (for example, downlink control information (DCI)). This is not limited in the present disclosure.

Therefore, based on the method for allocating a resource for uplink transmission without scheduling in the Background, a fixed uplink slot may be configured for the terminal. In other words, a fixed uplink time resource is allocated to the terminal, and a specific fixed frequency resource is allocated to the terminal, to perform grant-free transmission of uplink data on the allocated time-frequency resources.

FIG. 1 is a schematic diagram of allocating a time-frequency resource in the method in the Background. The allocated time resource in a time dimension is the fixed uplink time resource, for example, the fixed uplink slot. In this application, the time resource is also referred to as a first time resource. The allocated frequency resource in a frequency dimension is a first frequency resource.

It should be noted that, only a part of the first time resource is shown in the figure. Actually, the first time resource may be a periodic resource, and in another time, a first time resource may also be included. For ease of description, only a part of the first time resource is shown in this application. Details are not subsequently described again.

Therefore, based on the method for allocating a time-frequency resource in the Background, the grant-free transmission of the uplink data can be performed only on the time-frequency resource including the first time resource and the first frequency resource, namely, a time-frequency resource "1" in FIG. 1.

Figure 2:
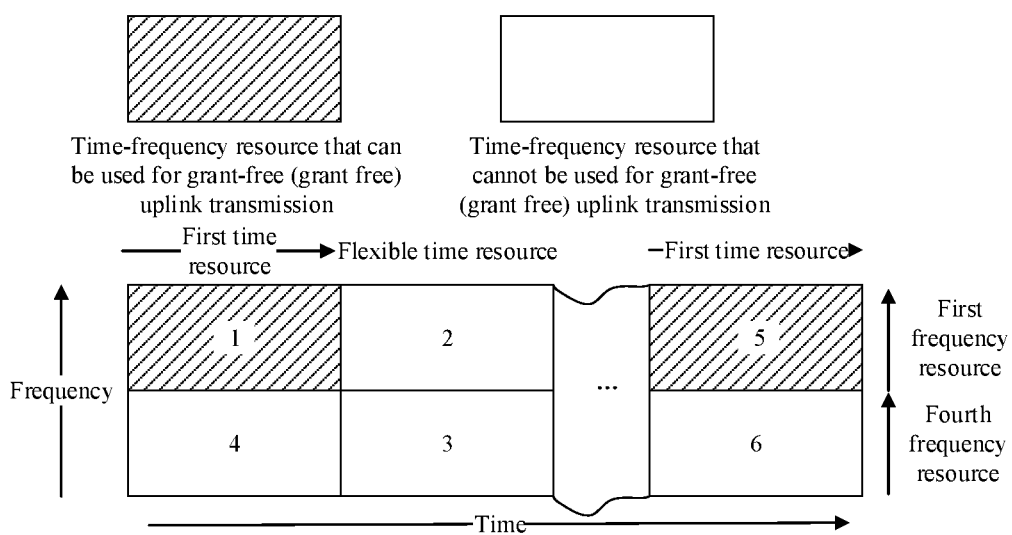
FIG. 2 is another schematic diagram of allocating a time-frequency resource in the method in the Background.

Based on the method shown in FIG. 1, when the terminal is currently within a time interval to which a time-frequency resource "2" belongs and the terminal needs to perform the grant-free uplink transmission, namely, the uplink transmission without scheduling, because the time-frequency resource "2" is not configured for the grant-free uplink transmission, the terminal needs to wait for arrival of a next period to perform the grant-free uplink transmission on the time-frequency resource configured for the grant-free uplink transmission. For example, FIG. 2 is another schematic diagram of allocating a time-frequency resource in the method in the Background. A time-frequency resource "5" is a time-frequency resource that is in a next period and that is configured for the grant-free uplink transmission. The time-frequency resource is referred to as the first time resource in the time dimension, and is referred to as the first frequency resource in the frequency dimension. Therefore, the terminal may perform the grant-free uplink transmission on the time-frequency resource "5", but this causes latency of performing the grant-free uplink transmission by the terminal. If there is no time-frequency resource in a subsequent period that can be used for the grant-free uplink transmission, a shortage of resources is even caused, transmission competition and collision increase, and a high-reliability requirement of a high-reliability service cannot be ensured.

To resolve the foregoing problem and meet low-latency and high-reliability requirements of a terminal service, this application provides a wireless communication method. A terminal receives first higher layer signaling from a base station, where the first higher layer signaling is used to configure a first time resource and a first frequency resource, and the first time resource and the first frequency resource can be used for uplink transmission without scheduling; and the terminal receives downlink control information, where the downlink control information is used to indicate a format of a slot, the format indicates a transmission direction of a symbol in the slot, and an uplink symbol in the slot is a time resource that can be used for the uplink transmission without scheduling. In the method, the base station indicates, via the first higher layer signaling, the first time resource and the first frequency resource that can be used for the uplink transmission without scheduling, and further indicates the format of the slot via the downlink control information, and the uplink symbol in the slot can also be used for the uplink transmission without scheduling. Therefore, the base station may dynamically allocate, to the terminal via the downlink control information, the time resource that can be used for the uplink transmission without scheduling. When the first time resource is unavailable or insufficient, the dynamically allocated time resource may be used for the uplink transmission without scheduling, thereby meeting a low-latency requirement and a high-reliability requirement of the service.

With reference to the accompanying drawings, the following describes in detail the wireless communication method provided in this application.

Figure 3:
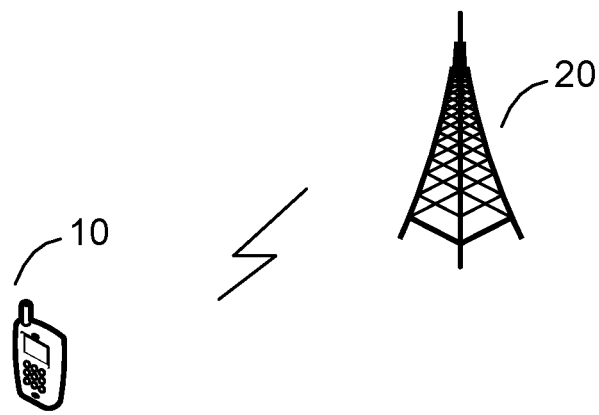
FIG. 3 is a schematic diagram of a possible network architecture according to this application.

FIG. 3 is a schematic diagram of a possible network architecture according to this application. The network architecture includes at least one terminal 10, and the terminal 10 communicates with a base station 20 via a wireless interface. For clarity, only one base station and one terminal are shown in the figure.

The terminal is a device that has a wireless transceiver function and that may be deployed on land, for example, an indoor device, an outdoor device, a handheld device, or an in-vehicle device; or the terminal may be deployed on the water (for example, on a ship), or may be deployed in the air (for example, on a plane, a balloon, or a satellite). The terminal may be a mobile phone, a tablet computer (pad), a computer with a wireless transceiver function, a virtual reality (VR) terminal, an augmented reality (AR) terminal, a wireless terminal in industrial control, a wireless terminal in self-driving, a wireless terminal in a remote medical treatment, a wireless terminal in a smart grid, a wireless terminal in transportation safety, a wireless terminal in a smart city, a wireless terminal in a smart home, or the like.

The base station is a device that connects a terminal to a wireless network. The base station includes but is not limited to a gNB in 5G, an evolved NodeB (eNB), a radio network controller (RNC), a NodeB (NB), a base station controller (BSC), a base transceiver station (BTS), a home base station (for example, a home evolved nodeB or a home nodeB, HNB), a baseband unit (BBU), a gNodeB (gNB), a transmission reception point (transmitting and receiving point, TRP), a transmission point (transmitting point, TP), a mobile switching center, or the like. In addition, the base station may alternatively include a WiFi access point (AP) or the like.

The embodiments of this application may be used for transmission without scheduling (which may be expressed as "grant free transmission" in English)). The grant-free transmission may be used for transmission of a large quantity of MTC-type services in a future network and a low-latency and high-reliability service. The grant-free transmission may be specific to uplink data transmission. A person skilled in the art can know that the grant-free transmission may have another name, such as spontaneous access, spontaneous multiple access, or contention-based multiple access. Each embodiment of this application may be applied to a communications system using non-orthogonal multiple access.

For example, there are the following three types of grant-free transmission:

Type 1: Uplink data transmission is performed based on only RRC configuration/reconfiguration information without the base station delivering grant information.

Type 2: Uplink data transmission is performed without the base station delivering grant information, but the grant-free transmission needs to be activated/deactivated based on an indication of RRC configuration information and physical layer signaling (for example, L1 signaling).

Type 3: Uplink data transmission is performed without the base station delivering grant information, and some parameters semi-statically configured via RRC signaling may be modified based on RRC configuration/reconfiguration information via physical layer signaling (for example, L1 signaling), but the grant-free transmission does not need to be activated/deactivated via the physical layer signaling (for example, L1 signaling).

Figure 4:
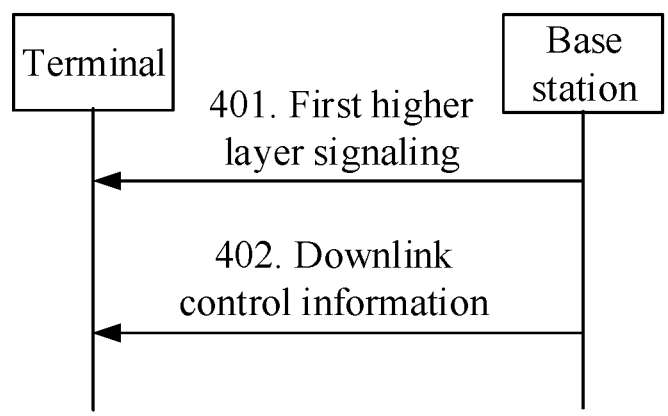
FIG. 4 is a wireless communication method according to this application.

As shown in FIG. 4, this application provides a wireless communication method. The method is applicable to the network architecture shown in FIG. 3, and the method includes the following steps.

Step 401: A base station sends first higher layer signaling to a terminal, and the terminal receives the first higher layer signaling from the base station.

In an implementation, when the grant-free transmission is of the type 1 or the type 3, the first higher layer signaling is used to configure a first time resource and a first frequency resource, and the first time resource and the first frequency resource can be used for uplink transmission without scheduling. The first time resource may be, for example, a fixed uplink symbol in a slot, and in other words, the first time resource is a symbol dedicatedly used in an uplink transmission direction.

As shown in FIG. 1 and FIG. 2, the time-frequency resources "1" and "5" are first time resources in a time dimension and first frequency resources in a frequency dimension.

In other words, the base station allocates, to the terminal by performing step 401, a time-frequency resource that can be used for the uplink transmission without scheduling, an allocated time resource is the first time resource, and a symbol in the first time resource is dedicatedly used for uplink.

In another implementation, when the grant-free transmission is of the type 2, the first higher layer signaling needs to indicate the first time resource instead of the first frequency resource. The first frequency resource may be indicated by the base station via the L1 signaling.

In addition, in another implementation in which the grant-free transmission is of the type 3, the first higher layer signaling may alternatively indicate the first time resource instead of the first frequency resource. The first frequency resource may be indicated by the base station via the L1 signaling.

Step 402: The base station sends downlink control information to the terminal, and the terminal receives the downlink control information from the base station.

The downlink control information is used to indicate a format of the slot, and the format may also be referred to as a slot format. The format indicates a transmission direction of a symbol in the slot, and an uplink symbol in the slot is a time resource that can be used for the uplink transmission without scheduling.

All uplink symbols in the slot may be used for the uplink transmission without scheduling, or some uplink symbols in the slot may be used for the uplink transmission without scheduling.

In addition, for the uplink symbols that are in the slot and that can be used for the uplink transmission without scheduling, the uplink transmission without scheduling may be performed via all of the uplink symbols, or the s uplink transmission without scheduling may be performed via only some of these symbols.

In the wireless communication method shown in FIG. 4, the base station indicates, via the first higher layer signaling, the first time resource and the first frequency resource that can be used for the uplink transmission without scheduling, and further indicates the format of the slot via the downlink control information, and the uplink symbol in the slot can also be used for the uplink transmission without scheduling. Therefore, the base station may dynamically allocate, to the terminal via the downlink control information, the time resource that can be used for the uplink transmission without scheduling. When the first time resource is unavailable or insufficient, the dynamically allocated time resource may be used for the uplink transmission without scheduling, thereby meeting a low-latency requirement and a high-reliability requirement of the service.

In step 402, the base station may indicate, depending on a specific case, the format of the slot via the downlink control information. An example in which one slot includes seven symbols is used for description. A transmission direction of each symbol may be uplink, downlink, or unknown (in other words, the symbol may be used as at least one of an unknown resource, a reserved resource, or a GP). Therefore, there are $3^7$ formats for each slot. Specifically, a specific format used for the slot is indicated by the base station. For another example, if the slot includes 14 symbols, there are $3^{14}$ formats in each slot.

Certainly, in actual use, not all formats are used. Usually, to-be-used specific formats are predefined, and then the base station indicates a selected specific format via indication information.

Figure 5:
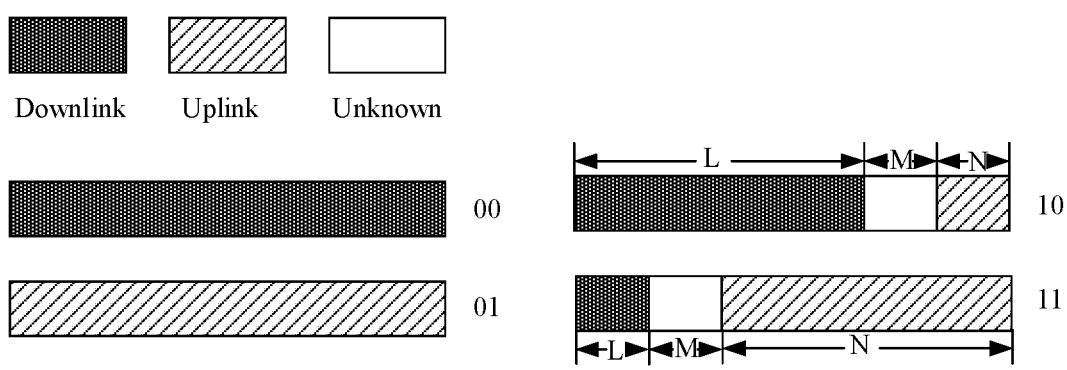
FIG. 5 is a diagram of an example of a slot format according to this application.

For example, FIG. 5 is a diagram of an example of a slot format according to this application. It is assumed that four used slot formats are defined in a protocol, the first slot format represents that all symbols are downlink symbols, and is denoted as "00"; the second slot format represents that all symbols are uplink symbols, and is denoted as "01"; the third slot format represents L consecutive downlink symbols+M consecutive unknown symbols+N consecutive uplink symbols, and the third slot format is denoted as "10", where L+M+N equals a quantity of symbols included in one slot, L>N, and values of L, M, and N are defined in the protocol; and the fourth slot format represents L consecutive downlink symbols+M consecutive unknown symbols+N consecutive uplink symbols, and the fourth slot format is denoted as "11", where L+M+N equals a quantity of symbols included in one slot, L<N, and values of L, M, and N are defined in the protocol.

Information about the several types of formats is preconfigured for both the base station and the terminal. Therefore, for one slot, for example, when the slot format that is indicated by the base station is "00", the terminal knows that the format of the slot represents that all symbols are used for downlink. For another example, when the slot format that is indicated by the base station is "11", the terminal knows that the format of the slot represents L consecutive downlink symbols+M consecutive unknown symbols+N consecutive uplink symbols, L<N, and values of L, M, and N are defined in the protocol.

In step 402, the base station indicates the format of the slot via the downlink control information, and specifically indicates the format of the slot in the candidate time resource set. In actual application, there are a plurality of methods for determining a time resource set. The following describes examples of several methods.

The candidate time resource set may be a set of one or more radio frames, each radio frame includes a plurality of subframes, and each subframe includes a plurality of slots. Therefore, the candidate time resource set may be considered as including a plurality of slots.

The candidate time resource set may alternatively be a set of one or more subframes, and each subframe includes a plurality of slots. Therefore, the candidate time resource set may be considered as including a plurality of slots.

The candidate time resource set may alternatively be a set of one or more slots. In this case, the candidate time resource set may also be referred to as a candidate slot set.

Method 1: The candidate time resource set is indicated by the base station.

If the method 1 is used, before or after step 402, the method further includes: sending, by the base station, second higher layer signaling to the terminal, where the second higher layer signaling is used to indicate the candidate time resource set. In addition, in step 402, the downlink control information indicates the format of the slot, namely, a format of a slot in the candidate time resource set; or this may be understood as indicating that control information delivered by the base station indicates the format of the slot in the candidate time resource set indicated by the second higher layer signaling.

Therefore, in the method 1, the base station explicitly notifies the terminal, and the format of the slot indicated via the downlink control information is the format of the slot in the candidate time resource set.

Method 2: The candidate time resource set is predefined.

In the method 2, the base station and the terminal predefine that a slot in the candidate time resource set is a slot in a time resource other than the first time resource. Therefore, when the terminal determines the first time resource, the candidate time resource set may be determined. In another implementation of the method 2, the base station and the terminal predefine that a slot in the candidate time resource set is a slot in a time resource other than the first time resource and a reserved resource. Therefore, when the terminal determines the first time resource and the reserved resource, the candidate time resource set may be determined. The method may specifically further include the following implementations:

Implementation 1: The terminal groups, into the candidate time resource set, a first slot in all time resources except the first time resource or a first slot in all time resources except the first time resource and the reserved resource. The first slot is a slot that includes a symbol whose transmission direction can be flexibly configured. Alternatively, this may be understood as indicating that the first slot is a slot whose slot format can be flexibly configured, and in other words, the slot format of the first slot is dynamically indicated by the base station via the downlink control information. For example, indication information for the slot format is carried on a group common downlink control channel of the terminal, and the slot format refers to a transmission direction of a symbol in the slot.

Implementation 2: The terminal groups, into the candidate time resource set, a second slot in another time resource in a current system frame of the terminal other than the first time resource or a second slot in another time resource in a current system frame of the terminal other than the first time resource and the reserved resource. The second slot is a slot that includes a symbol whose transmission direction can be flexibly configured. In other words, the slot format of the second slot is dynamically indicated by the base station via the downlink control information. For example, indication information for the slot format is carried on a group common downlink control channel of the terminal.

Implementation 3: The terminal groups, into the candidate time resource set, a third slot in another time resource in time resources allocated to the terminal other than the first time resource or a third slot in another time resource in time resources allocated to the terminal other than the first time resource and the reserved resource. The third slot is a slot that includes a symbol whose transmission direction can be flexibly configured. In other words, the slot format of the third slot is dynamically indicated by the base station via the downlink control information. For example, indication information for the slot format is carried on a group common downlink control channel of the terminal.

Therefore, by performing the foregoing method 1 or method 2, the terminal may determine specific slots whose formats are indicated in the downlink control information. Specifically, a format of each slot may be represented by bits. For example, as shown in FIG. 5, when there are only four predefined slot formats, the format of each slot may be one of "00", "01", "10", and "11". Certainly, if there are K types of predefined formats and K is greater than 1, it indicates that a quantity of bits required by each slot is $\lceil \log_2 K \rceil$.

The terminal may determine the format of each slot in the candidate time resource set based on the format of the slot that is indicated by the base station, further determine specific symbols in each slot that are indicated by the base station as uplink symbols, and use the uplink symbols to perform the uplink transmission without scheduling.

In the foregoing method embodiments, the time resource that can be used by the terminal to perform the uplink transmission without scheduling is indicated. For a frequency resource corresponding to the time resource, there may also be a plurality of implementations. The implementations are separately described below.

For ease of description, the frequency resource corresponding to the time resource indicated in the downlink control information is referred to as a second frequency resource in this application. There are the following two implementations.

Implementation 1: The second frequency resource is equal to the first frequency resource.

In this implementation, the frequency resource corresponding to the time resource indicated in the downlink control information is the same as the first frequency resource. A method for determining the second frequency resource by the terminal may include the following two specific implementations. In an implementation, it is predefined that the second frequency resource is equal to the first frequency resource. Therefore, the terminal may determine the second frequency resource based on the first frequency resource, or this may be understood as indicating that the terminal directly uses the first frequency resource. In the other implementation, the base station directly indicates the second frequency resource via third higher layer signaling. In other words, before or after step 402, the method further includes: receiving, by the terminal, the third higher layer signaling from the base station, where the third higher layer signaling is used to indicate the second frequency resource, and the second frequency resource is equal to the first frequency resource.

Based on the implementation 1, the terminal may perform the uplink transmission without scheduling on an uplink symbol in a slot indicated in the downlink control information and the second frequency resource.

FIG. 6(*a*) is a schematic diagram of allocating a time-frequency resource according to this application. The second frequency resource is equal to the first frequency resource, and the time resource indicated by the base station via the downlink control information is a symbol that is in a flexible time resource and that is indicated as being used for uplink transmission. For example, as shown in FIG. 6(*a*), a format of the time resource indicated by the base station is the fourth slot format shown in FIG. 5. Certainly, a time resource of only one indicated slot is shown in the figure, and the base station may alternatively indicate formats of a plurality of slots in the candidate time resource set.

FIG. 6(*b*) is another schematic diagram of allocating a time-frequency resource according to this application. The base station indicates, via the downlink control information, the time resource that can be used for the uplink transmission without scheduling. Specifically, the time resource is an uplink symbol and forms, in combination with the second frequency resource, the time-frequency resource that can be used for the grant-free uplink transmission. FIG. 6(*b*) shows a time-frequency resource including an uplink symbol and a second frequency in a time-frequency resource "2", and a time-frequency resource including all slots in a time-frequency resource "5" (in other words, all slots in the time-frequency resource "5" are uplink symbols) and an uplink symbol and a second frequency in a time-frequency resource "6".

In the foregoing implementation 1, the base station indicates or predefines that the second frequency resource is the same as the first frequency resource, and then determines the uplink symbol with reference to the format of the time resource indicated by the base station via the downlink control information, so that the time-frequency resource that can be used for the uplink transmission without scheduling is formed.

Implementation 2: The second frequency resource is a subset of the first frequency resource.

In this implementation, a frequency resource corresponding to the time resource indicated in the downlink control information, namely, the second frequency resource, is the subset of the first frequency resource. Herein, a meaning of the subset is as follows: The second frequency resource is the same as the first frequency resource, or the second frequency resource is a proper subset of the first frequency resource.

When the second frequency resource is the same as the first frequency resource, refer to the foregoing implementation 1. Details are not described herein again.

When the second frequency resource is the proper subset of the first frequency resource, the base station indicates the second frequency resource via third higher layer signaling. In other words, before or after step 402, the method further includes: receiving, by the terminal, the third higher layer signaling from the base station, where the third higher layer signaling is used to indicate the second frequency resource, and the second frequency resource is the proper subset of the first frequency resource.

Based on the implementation 2, the terminal may perform the uplink transmission without scheduling on an uplink symbol in a slot indicated in the downlink control information and the second frequency resource.

Figure 7A:
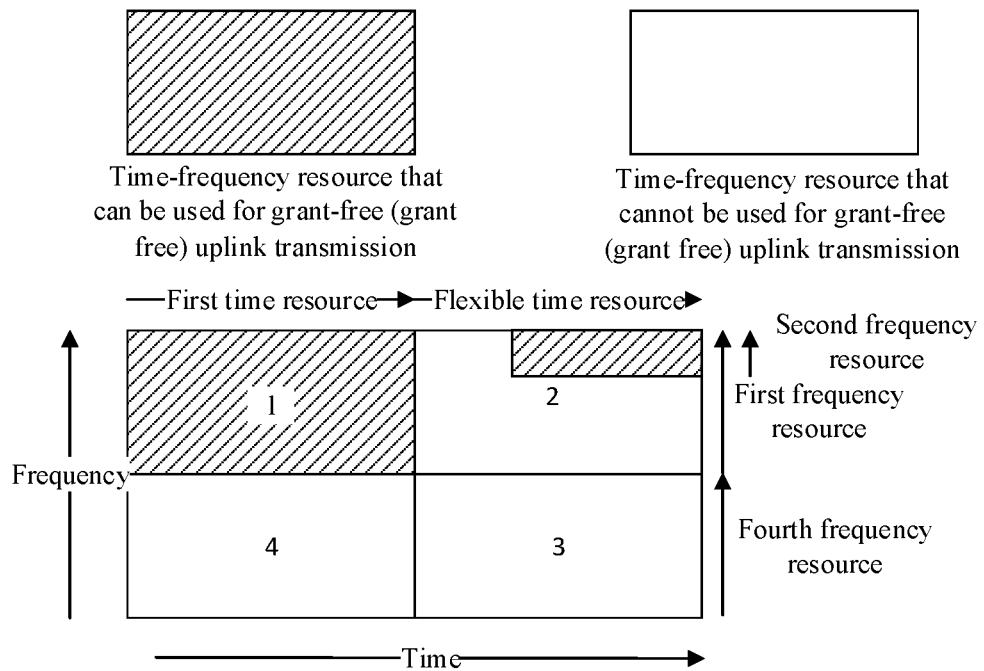
FIG. 7(a) is still another schematic diagram of allocating a time-frequency resource according to this application.

FIG. 7(a) is still another schematic diagram of allocating a time-frequency resource according to this application. The second frequency resource is the proper subset of the first frequency resource, and the time resource indicated by the base station via the downlink control information is a symbol that is in a flexible time resource and that is indicated as being used for uplink transmission. For example, as shown in FIG. 7(a), a format of the time resource indicated by the base station is the fourth slot format shown in FIG. 5. Certainly, a time resource of only one indicated slot is shown in the figure, and the base station may alternatively indicate formats of a plurality of slots in the candidate time resource set.

Figure 7B:
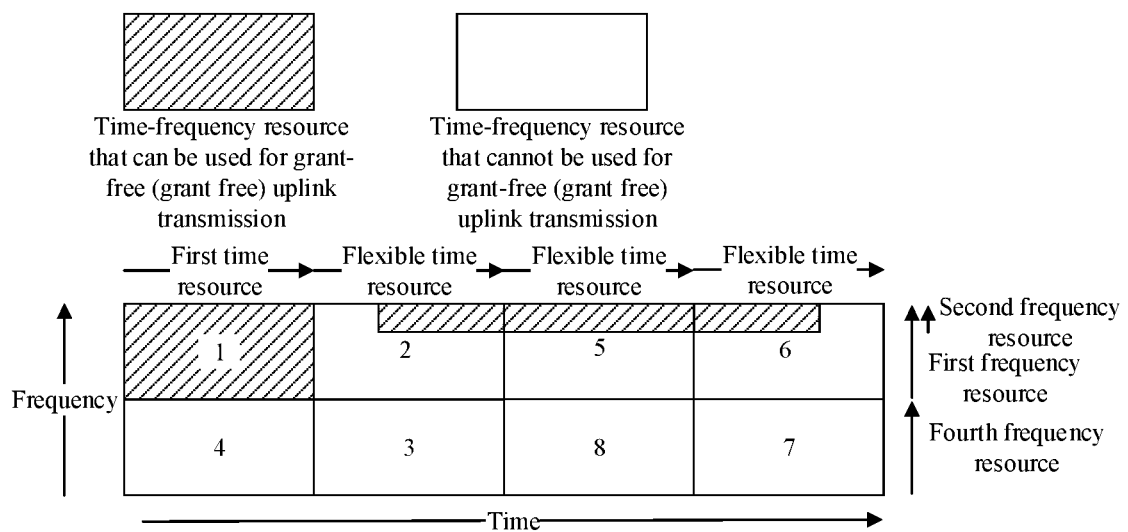
FIG. 7(b) is yet another schematic diagram of allocating a time-frequency resource according to this application.

FIG. 7(b) is yet another schematic diagram of allocating a time-frequency resource according to this application. The base station indicates, via the downlink control information, the time resource that can be used for the uplink transmission without scheduling. Specifically, the time resource is an uplink symbol and forms, in combination with the second frequency resource, the time-frequency resource that can be used for the grant-free uplink transmission. FIG. 7(b) shows a time-frequency resource including an uplink symbol and a second frequency in a time-frequency resource "2", a time-frequency resource including an uplink symbol and a second frequency in a time-frequency resource "5", and a time-frequency resource including an uplink symbol and a second frequency in a time-frequency resource "6".

Figure 7C:
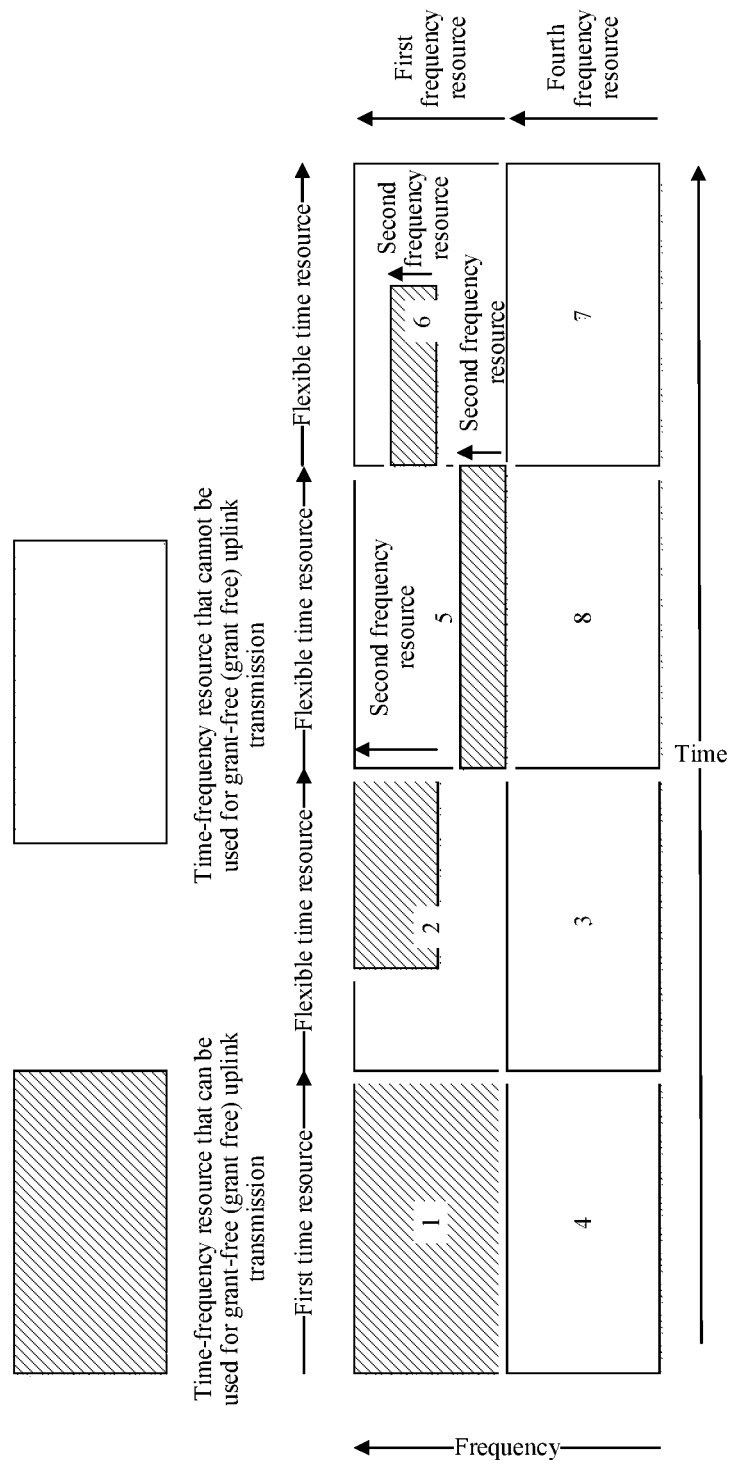
FIG. 7(c) is still yet another schematic diagram of allocating a time-frequency resource according to this application.

Certainly, in another implementation, each slot indicated in the downlink control information may be respectively corresponding to one second frequency resource indicated by the base station via the third higher layer signaling. This may be alternatively understood as indicating that second frequency resources of different slots may be the same or may be different. FIG. 7(c) is still yet another schematic diagram of allocating a time-frequency resource according to this application. A second frequency resource indicated in the time-frequency resource "2", a second frequency resource indicated in the time-frequency resource "5", and a second frequency resource indicated in the time-frequency resource "6" are different from each other.

It should be noted that, in actual use, if the implementation 2 is used, whether the implementation shown in FIG. 7(b) or the implementation shown in FIG. 7(c) is used may be determined based on a requirement. This is not limited in this application.

In the foregoing implementation 2, the base station indicates the second frequency resource, and then determines the uplink symbol with reference to the format of the time resource indicated by the base station via the downlink control information, so that the time-frequency resource that can be used for the uplink transmission without scheduling is formed.

In another possible design manner, this application further provides a method for determining a time-frequency resource that can be used for uplink transmission without scheduling. Optionally, before or after step 402, the method further includes: sending, by the base station, the indication information, where the indication information is used to indicate a second time resource, and the time resource and a frequency resource other than the first frequency resource can be used for the uplink transmission without scheduling. For ease of description, the frequency resource other than the first frequency resource is referred to as a fourth frequency resource. The fourth frequency resource may be understood as another frequency resource in available frequency resources allocated by the base station to the terminal other than the first frequency resource.

The indication information may be explicit indication information. For example, the indication information is carried on the group common PDCCH. Alternatively, the indication information is implicitly indicated by a first control channel element (CCE) in search space of the group common PDCCH.

After receiving the indication information, the terminal obtains the second time resource indicated in the indication information, and determines, based on predefinition, that a used frequency resource corresponding to the second time resource is the fourth frequency resource. Therefore, the terminal determines that the time-frequency resource including the second time resource and the fourth frequency resource is a time-frequency resource that can be used for the uplink transmission without scheduling.

Figure 8A:
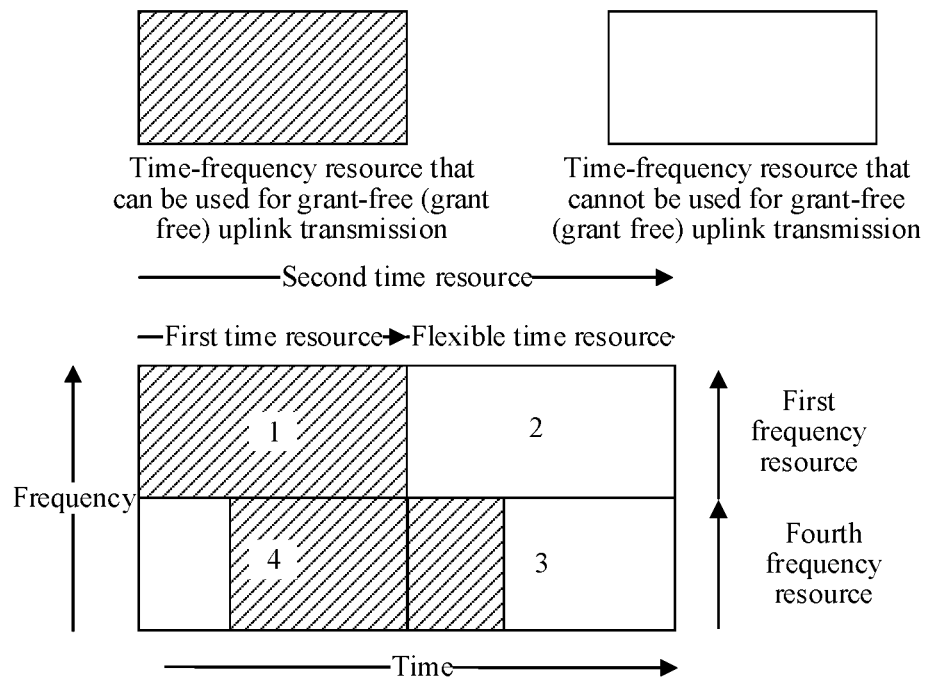
FIG. 8(a) is a further schematic diagram of allocating a time-frequency resource according to this application.

FIG. 8(a) is a further schematic diagram of allocating a time-frequency resource according to this application. The second time resource and the first time resource are partially overlap each other. Certainly, alternatively, the second time resource and the first time resource may not overlap each other.

Figure 8B:
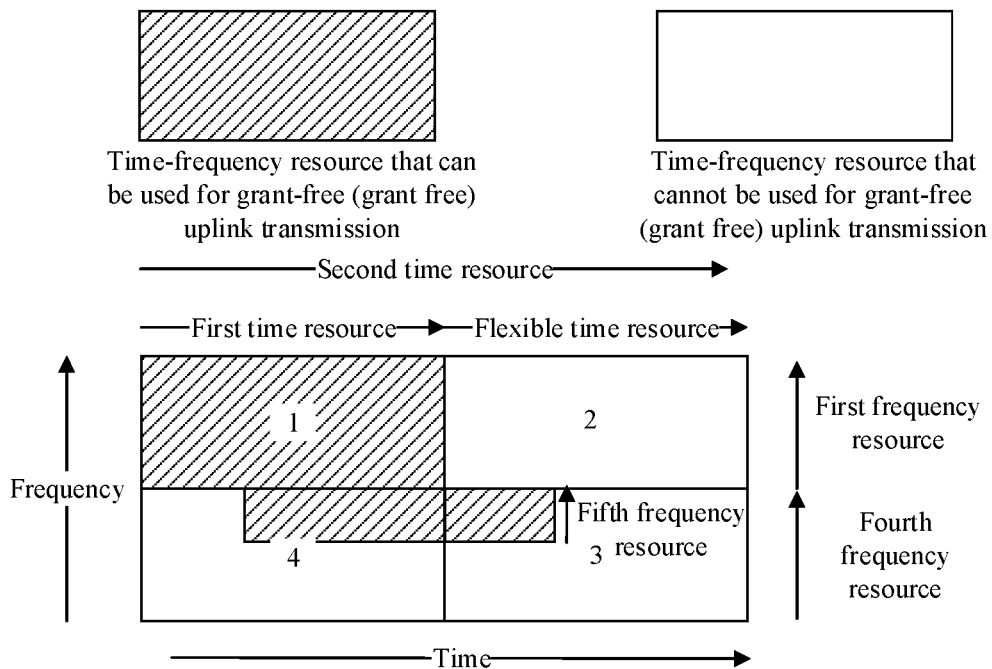
FIG. 8(b) is a still further schematic diagram of allocating a time-frequency resource according to this application.

In another implementation, the implementation may be alternatively combined with the foregoing implementation 1 and implementation 2 for use. For example, a part of the fourth frequency resource may be additionally indicated via higher layer signaling delivered by the base station. The part of frequency resource is referred to as a fifth frequency resource, and used as a used frequency resource corresponding to the second time resource. FIG. 8(b) is a still further schematic diagram of allocating a time-frequency resource according to this application. The terminal determines that a time-frequency resource including a second time resource and a fifth frequency resource is a time-frequency resource that can be used for the uplink transmission without scheduling.

Figure 8C:
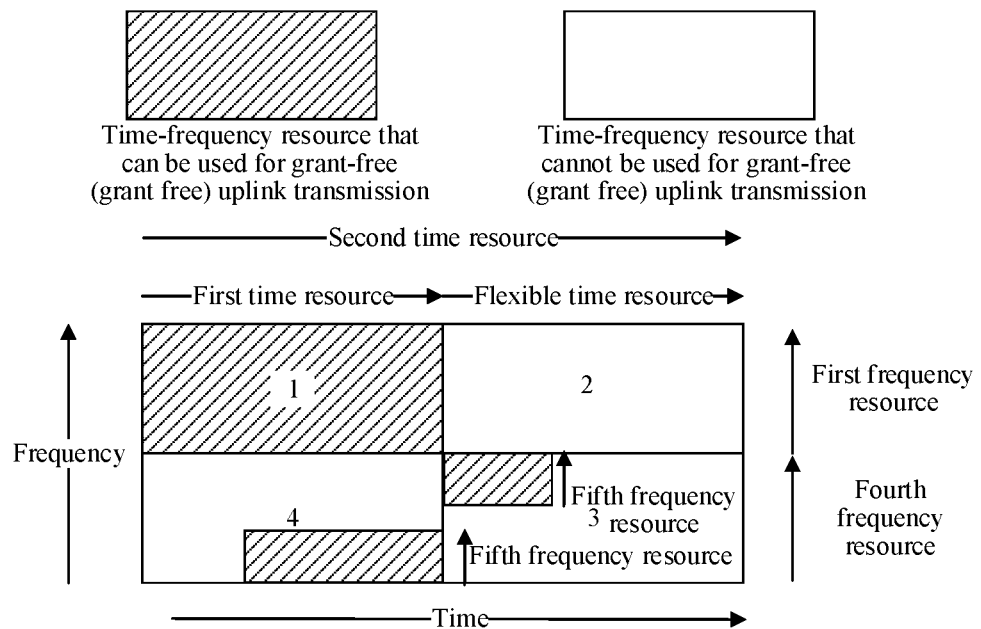
FIG. 8(c) is a yet further schematic diagram of allocating a time-frequency resource according to this application.

Certainly, each slot in the second time resource may be corresponding to one fifth frequency resource indicated in the higher layer signaling delivered by the base station. This may be alternatively understood as indicating that fifth frequency resources of different slots may be the same or may be different. FIG. 8(c) is a yet further schematic diagram of allocating a time-frequency resource according to this application. A fifth frequency resource indicated in the time-frequency resource "4" and a fifth frequency resource indicated in the time-frequency resource "3" are different from each other.

Figure 6A:
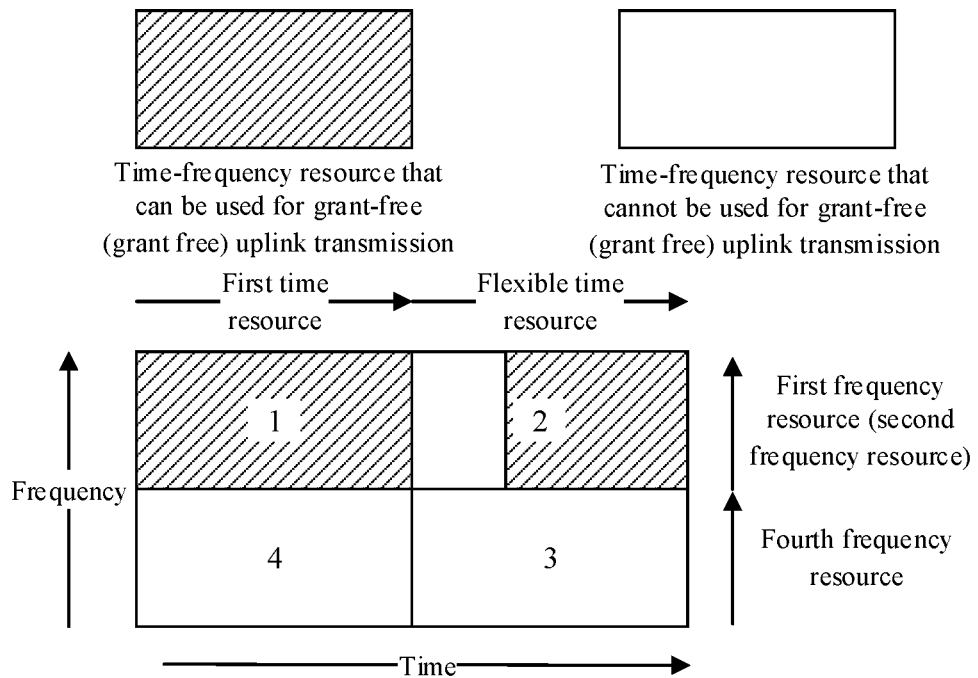
FIG. 6(a) is a schematic diagram of allocating a time-frequency resource according to this application.
Figure 6B:
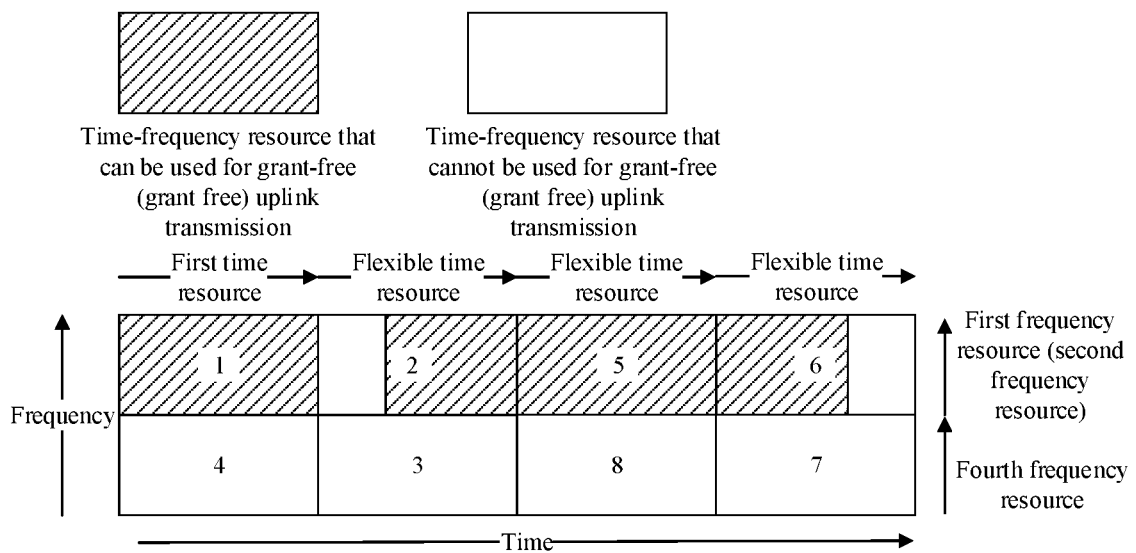
FIG. 6(b) is another schematic diagram of allocating a time-frequency resource according to this application.
Figure 9:
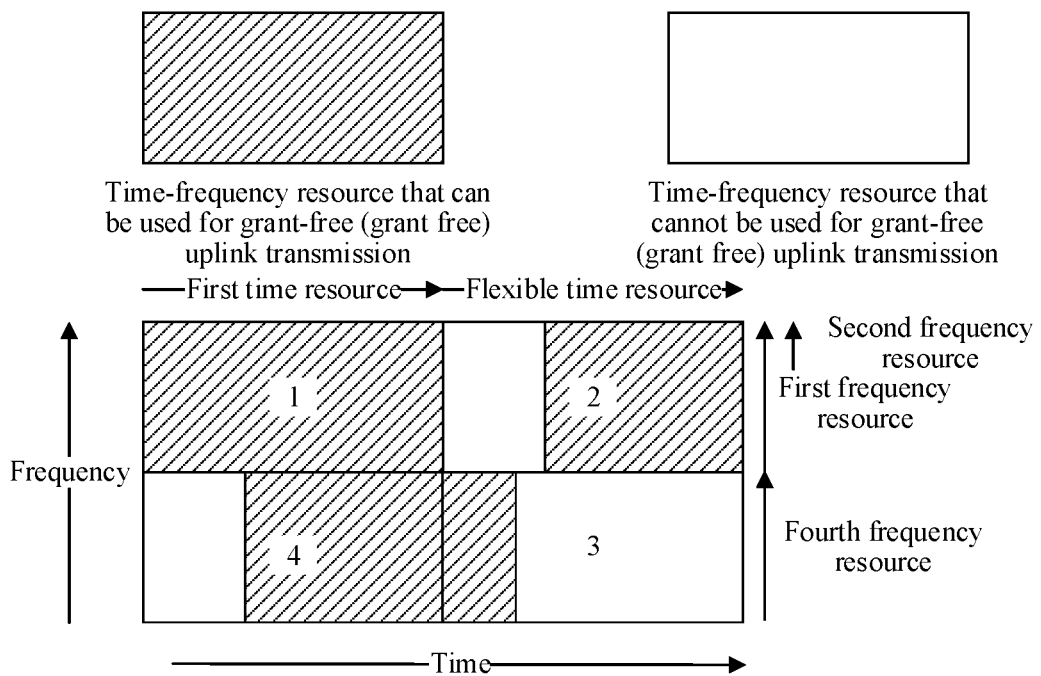
FIG. 9 is a still yet further schematic diagram of allocating a time-frequency resource according to this application.

In another implementation, implementations shown in FIG. 8(a) to FIG. 8(c) may be alternatively combined with implementations shown in FIG. 7(a) to FIG. 7(c) and implementations shown in FIG. 6(a) and FIG. 6(b) to form a new implementation. For example, FIG. 9 is a still yet further schematic diagram of allocating a time-frequency resource according to this application. The implementation is an implementation formed by combining the implementation shown in FIG. 8(a) and the implementation shown in FIG. 6(a). Another combined implementation is not illustrated in this application.

In another possible design manner, this application further provides a method for determining a time-frequency resource that can be used for uplink transmission without scheduling. Optionally, before or after step 402, the method further includes: sending, by the base station, an uplink scheduling grant to the terminal, where the uplink scheduling grant is used to indicate a scheduled third time resource and third frequency resource, an unused uplink symbol in a slot of the third time resource and the third frequency resource can also be used for the uplink transmission without scheduling.

In this implementation, the base station indicates, through uplink scheduling, an uplink resource that can be used by the terminal. If a part of uplink time-frequency resource in the uplink resources is unused, the unused uplink time-frequency resource may be used to perform the uplink transmission without scheduling.

The implementation may be combined with any one of the foregoing implementations for use. To be specific, the implementation may be combined with any one of implementations in FIG. 6(a) and FIG. 6(b), FIG. 7(a) to FIG. 7(c), and FIG. 8(a) to FIG. 8(c) for use.

Figure 10:
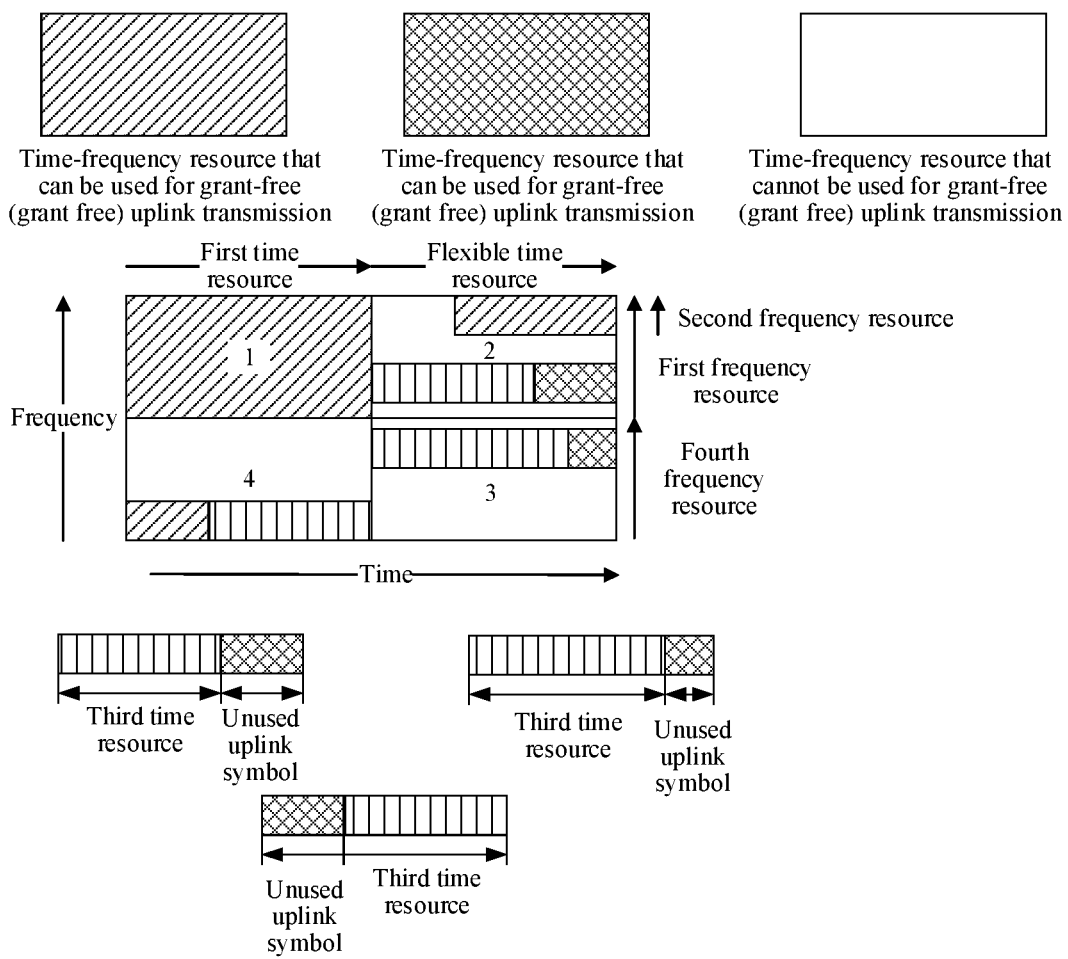
FIG. 10 is even yet another schematic diagram of allocating a time-frequency resource according to this application.

FIG. 10 is even yet another schematic diagram of allocating a time-frequency resource according to this application. The implementation may be combined with any one of implementations in FIG. 6(a) and FIG. 6(b), FIG. 7(a) to FIG. 7(c), FIG. 8(a) to FIG. 8(c), and FIG. 9 for use. In FIG. 10, an example in which the implementation is combined with the implementation shown in FIG. 7(a) is used for description. The base station indicates, via the uplink scheduling grant, that some symbols in three slots are used as uplink scheduling resources. Specifically, the base station separately indicates a third time resource and a third frequency resource in time-frequency resources "2", "3", and "4".

There is an unused uplink symbol in each slot of the third time resource. Therefore, the unused uplink symbols in the three slots may be used by the terminal as a uplink resource without scheduling to transmit uplink data.

In this manner, another method for determining a time-frequency resource that can be used for uplink transmission without scheduling is provided. To be specific, the base station sends the uplink scheduling grant to the terminal, where the uplink scheduling grant is used to indicate the scheduled third time resource and third frequency resource. When there is an unused uplink symbol in the slot of the third time resource, the uplink transmission without scheduling may be performed via the unused uplink symbol and the third frequency resource, thereby further adding a resource used for the uplink transmission without scheduling, further reducing latency, and improving service reliability.

This application provides a plurality of methods for dynamically allocating a uplink resource without scheduling to a terminal. The method may be any one of implementations in FIG. 6(a) and FIG. 6(b), FIG. 7(a) to FIG. 7(c), FIG. 8(a) to FIG. 8(c), FIG. 9, and FIG. 10, or may be a combination of any two or more implementations. Based on these implementations, a uplink resource without scheduling may be dynamically allocated to the terminal, to meet a low-latency requirement and a high-reliability requirement of some services of the terminal.

In this application, in any one or a combination of the plurality of implementations, after a resource that can be used for the uplink transmission without scheduling is dynamically allocated to the terminal, the terminal may send data on the resource that can be used for the uplink transmission without scheduling.

Figure 11:
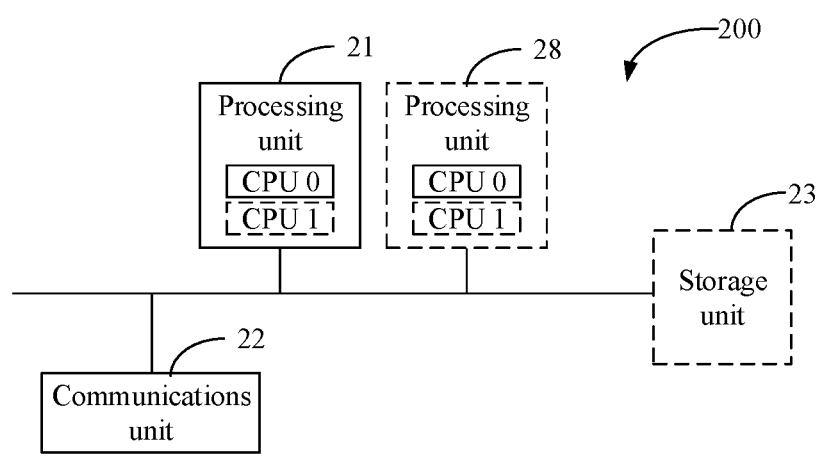
FIG. 11 is a schematic diagram of an apparatus according to this application.

FIG. 11 is a schematic diagram of an apparatus according to this application. The apparatus may be a terminal or a base station in any one of the foregoing embodiments. The apparatus may be a terminal or a chip in the terminal in a system architecture shown in FIG. 3, or may be a base station or a chip in the base station in the system architecture shown in FIG. 3.

An apparatus 200 may be configured to indicate a method performed by the terminal or the base station in any one of the foregoing wireless communication methods.

The apparatus 200 includes at least one processing unit 21 and a communications unit 22, and optionally, further includes a storage unit 23. The processing unit 21, the communications unit 22, and the storage unit 23 are connected via a communications bus.

The processing unit 21 may be a general-purpose central processing unit (CPU), a microprocessor, an application-specific integrated circuit (ASIC), or one or more integrated circuits configured to control program execution in the solutions of the present disclosure.

The communications bus may include a path for transmitting information between the foregoing units.

The communications unit 22 may be an apparatus with a transceiver function, and is configured to communicate with another device or a communications network, such as Ethernet, a radio access network (RAN), or a wireless local area network (WLAN).

The storage unit 23 may be a read-only memory (ROM), another type of static storage device that can store static information and an instruction, a random access memory (RAM), or another type of dynamic storage device that can store information and an instruction; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The storage unit 23 may exist independently, or is connected to the processing unit 21 via the communications bus. The storage unit 23 may be alternatively integrated with the processing unit. The storage unit 23 is configured to store application program code used to execute the solutions of the present disclosure, and the application program code is executed under control of the processing unit 21. The processing unit 21 is configured to execute the application program code stored in the storage unit 23.

In a specific implementation, in an embodiment, the processing unit 21 may include one or more CPUs, for example, a CPU 0 and a CPU 1 in FIG. 11.

In a specific implementation, in an embodiment, the apparatus 200 may include a plurality of processing units, for example, the processing unit 21 and a processing unit 28 in FIG. 11. Each of the processing units may be a single-core (single-CPU) processor, or may be a multi-core (multi-CPU) processor. Herein, the processor may refer to one or more devices, a circuit, and/or a processing core for processing data (for example, a computer program instruction).

In a possible design, when the apparatus is a base station or a terminal, the processing unit 21 may be, for example, a processor, the communications unit 22 may be, for example, a transceiver, and the transceiver includes a radio frequency circuit. When the apparatus further includes the storage unit 23, the storage unit 23 is configured to store a computer executable instruction, the processing unit 21 is connected to the storage unit 23, and the processing unit 21 executes the computer executable instruction stored in the storage unit 23, so that the base station or the terminal performs the wireless communication method in any one of the foregoing embodiments.

In another possible design, when the apparatus is a chip in the base station or a chip in the terminal, the processing unit 21 may be, for example, a processor, and the communications unit 22 may be, for example, an input/output interface, a pin, or a circuit. The processing unit 21 may execute the computer executable instruction stored in the storage unit, so that the chip performs the wireless communication method in the foregoing embodiment. Optionally, the storage unit is a storage unit in the chip, for example, a register or a cache. The storage unit may alternatively be a storage unit that is in the base station or the terminal and that is outside the chip, for example, a ROM, another type of static storage device that can store static information and an instruction, or a RAM.

That the chip performs the wireless communication method may be understood as indicating that the chip completes the wireless communication method in combination with another component in the apparatus.

For example, when the chip is the chip in the terminal, a communications unit of the chip is connected to a transceiver of the terminal, and the transceiver of the terminal may receive higher layer signaling from the base station, and therefore the communications unit of the chip may receive first higher layer signaling from the base station. Further, the processor of the terminal may control the transceiver of the terminal to receive the downlink control information. Therefore, the communications unit of the chip may receive the downlink control information from the transceiver, and send the downlink control information to the processing unit of the chip. In this way, the chip of the terminal implements the wireless communication method in the embodiments of the present disclosure.

For another example, when the chip is the chip in the base station, a communications unit of the chip is connected to a transceiver of the base station, a processing unit of the chip sends higher layer signaling to the transceiver of the base station via the communications unit, and the transceiver of the base station sends the first higher layer signaling to the terminal. Further, a processing unit of the chip sends the downlink control information to the transceiver of the base station via the communications unit, and then the transceiver of the base station sends the downlink control information to the terminal. In this way, the chip of the base station implements the wireless communication method in the embodiments of the present disclosure.

For example, when the apparatus is divided in the method shown in FIG. 11, the processing unit cooperates with the communications unit, so that the apparatus can implement the wireless communication method in any one of the foregoing embodiments of this application.

For example, when the apparatus shown in FIG. 11 is the terminal or the chip of the terminal, the processing unit is configured to control the communications unit to perform the following operations: receiving first higher layer signaling from a base station, where the first higher layer signaling is used to configure a first time resource and a first frequency resource, and the first time resource and the first frequency resource can be used for uplink transmission without scheduling; and receiving downlink control information, where the downlink control information is used to indicate a format of a slot, the format indicates a transmission direction of a symbol in the slot, and an uplink symbol in the slot is a time resource that can be used for the uplink transmission without scheduling.

It should be understood that, the terminal or the chip of the terminal may be configured to implement steps performed by the terminal in the wireless communication method in the embodiments of the present disclosure. For related features, refer to the foregoing descriptions. Details are not described herein again.

For example, when the apparatus shown in FIG. 11 is the base station or the chip of the base station, the processing unit is configured to control the communications unit to perform the following operations: sending first higher layer signaling to a terminal, where the first higher layer signaling is used to configure a first time resource and a first frequency resource, and the first time resource and the first frequency resource can be used for uplink transmission without scheduling; and sending downlink control information to the terminal, where the downlink control information is used to indicate a format of a slot, the format indicates a transmission direction of a symbol in the slot, and an uplink symbol in the slot is a time resource that can be used for the uplink transmission without scheduling.

It should be understood that, the base station or the chip of the base station may be configured to implement steps performed by the base station in the wireless communication method in the embodiments of the present disclosure. For related features, refer to the foregoing descriptions. Details are not described herein again.

This application further provides a computer-readable storage medium. The computer-readable storage medium stores an instruction, and when the instruction runs on a computer, the computer performs the wireless communication method. The computer may be a terminal or a base station.

This application provides a computer program product. The computer program product includes a computer software instruction, and the computer software instruction may be loaded via a processor, to implement the procedure in the wireless communication method in any one of the foregoing embodiments.

The foregoing descriptions of this specification in this application may enable a person skilled in the art to use or implement the content of this application. It should be considered that any modification made based on the disclosed content is obvious in the art. The basic principles described in this application may be applied to other variations without departing from the essence and scope of this application. Therefore, the content disclosed in this application is not limited only to the described embodiments and designs, but may further be extended to a maximum scope that is consistent with the principles and new disclosed features of this application.

What is claimed is:

1. A wireless communication method by a terminal or a chip in the terminal, the method comprising:
   receiving first higher layer signaling from a base station, wherein the first higher layer signaling configures a first time resource and a first frequency resource, and the first time resource and the first frequency resource are configured to be used for uplink transmission without scheduling; and
   receiving downlink control information, wherein the downlink control information indicates a format of a slot, and the format indicates a transmission direction of a symbol in the slot,
   wherein an uplink symbol in the slot is a time resource that is configured to be used for the uplink transmission without scheduling.

2. The method according to claim 1, further comprising:
receiving second higher layer signaling from the base station, wherein the second higher layer signaling indicates at least one candidate slot comprising the slot.

3. The method according to claim 1, further comprising:
receiving third higher layer signaling from the base station, wherein the third higher layer signaling indicates a second frequency resource, and the second frequency resource is a subset of the first frequency resource,
wherein the uplink symbol in the slot and the second frequency resource are configured to be used for the uplink transmission without scheduling.

4. The method according to claim 1, further comprising:
receiving indication information from the base station, wherein the indication information indicates a second time resource, and the second time resource and a frequency resource other than the first frequency resource are configured to be used for the uplink transmission without scheduling.

5. The method according to claim 1, further comprising:
sending data on the time resource in the slot that is configured to be used for the uplink transmission without scheduling.

6. A wireless communication method by a base station or a chip in the base station, the method comprising:
sending first higher layer signaling to a terminal, wherein the first higher layer signaling configures a first time resource and a first frequency resource, and the first time resource and the first frequency resource are configured to be used for uplink transmission without scheduling; and
sending downlink control information to the terminal, wherein the downlink control information indicate a format of a slot, and the format indicates a transmission direction of a symbol in the slot,
wherein an uplink symbol in the slot is a time resource that is configured to be used for the uplink transmission without scheduling.

7. The method according to claim 6, further comprising:
sending second higher layer signaling to the terminal, wherein the second higher layer signaling indicate at least one candidate slot comprising the slot.

8. The method according to claim 6, further comprising:
sending third higher layer signaling to the terminal, wherein the third higher layer signaling indicates a second frequency resource, and the second frequency resource is a subset of the first frequency resource,
wherein the uplink symbol in the slot and the second frequency resource are configured to be used for the uplink transmission without scheduling.

9. The method according to claim 6, further comprising:
sending indication information to the terminal, wherein the indication information indicates a second time resource, and the second time resource and a frequency resource other than the first frequency resource are configured to be used for the uplink transmission without scheduling.

10. The method according to claim 6, further comprising:
receiving data from the terminal on the time resource in the slot that is configured to be used for the uplink transmission without scheduling.

11. An apparatus, comprising:
at least one processor; and
a memory storing instructions, wherein the instructions are executed by the at least one processor to cause the apparatus perform operations of:
receiving first higher layer signaling from a base station, wherein the first higher layer signaling configures a first time resource and a first frequency resource, and the first time resource and the first frequency resource are configured to be used for uplink transmission without scheduling; and
receiving downlink control information, wherein the downlink control information indicates a format of a slot, and the format indicates a transmission direction of a symbol in the slot,
wherein an uplink symbol in the slot is a time resource that is configured to be used for the uplink transmission without scheduling.

12. The apparatus according to claim 11, wherein the operations further comprise:
receiving second higher layer signaling from the base station, wherein the second higher layer signaling is used to indicate at least one candidate slot comprising the slot.

13. The apparatus according to claim 11, wherein the operations further comprise:
receiving third higher layer signaling from the base station, wherein the third higher layer signaling indicates a second frequency resource, and the second frequency resource is a subset of the first frequency resource,
wherein the uplink symbol in the slot and the second frequency resource are configured to be used for the uplink transmission without scheduling.

14. The apparatus according to claim 11, wherein the operations further comprise:
receiving indication information from the base station, wherein the indication information indicates a second time resource, and the second time resource and a frequency resource other than the first frequency resource are configured to be used for the uplink transmission without scheduling.

15. The apparatus according to claim 11, wherein the operations further comprise:
sending data on the time resource in the slot that is configured to be used for the uplink transmission without scheduling.

16. An apparatus, comprising:
at least one processor; and
a memory storing instructions, wherein the instructions are executed by the at least one processor to cause the apparatus perform operations of:
sending first higher layer signaling to a terminal, wherein the first higher layer signaling configures a first time resource and a first frequency resource, and the first time resource and the first frequency resource are configured to be used for uplink transmission without scheduling; and
sending downlink control information to the terminal, wherein the downlink control information indicates a format of a slot, and the format indicates a transmission direction of a symbol in the slot,
wherein an uplink symbol in the slot is a time resource that is configured to be used for the uplink transmission without scheduling.

17. The apparatus according to claim 16, wherein the operations further comprise:
sending second higher layer signaling to the terminal, wherein the second higher layer signaling indicates at least one candidate slot comprising the slot.

18. The apparatus according to claim 16, wherein the operations further comprise:
sending third higher layer signaling to the terminal, wherein the third higher layer signaling indicates a second frequency resource, and the second frequency resource is a subset of the first frequency resource,
wherein the uplink symbol in the slot and the second frequency resource are configured to be used for the uplink transmission without scheduling.

19. The apparatus according to claim 16, wherein the operations further comprise:
sending indication information to the terminal, wherein the indication information indicates a second time resource, and the second time resource and a frequency resource other than the first frequency resource are configured to be used for the uplink transmission without scheduling.

20. The apparatus according to claim 16, wherein the operations further comprise:
receiving data from the terminal on the time resource in the slot that is configured to be used for the uplink transmission without scheduling.

\* \* \* \* \*